(12) United States Patent
Federspiel

(10) Patent No.: US 7,726,582 B2
(45) Date of Patent: Jun. 1, 2010

(54) METHOD AND APPARATUS FOR CONVERTING CONSTANT-VOLUME SUPPLY FANS TO VARIABLE FLOW OPERATION

(75) Inventor: Clifford Conrad Federspiel, El Cerrito, CA (US)

(73) Assignee: Federspiel Corporation, El Cerrito, CA (US)

( * ) Notice: Subject to any disclaimer, the term of this patent is extended or adjusted under 35 U.S.C. 154(b) by 818 days.

(21) Appl. No.: 11/331,613

(22) Filed: Jan. 13, 2006

(65) Prior Publication Data

US 2006/0161306 A1 Jul. 20, 2006

Related U.S. Application Data

(60) Provisional application No. 60/644,669, filed on Jan. 18, 2005.

(51) Int. Cl.
*F24F 7/00* (2006.01)
*G01M 1/38* (2006.01)
*G05B 13/00* (2006.01)

(52) U.S. Cl. ............... 236/49.3; 700/276; 700/277; 700/300

(58) Field of Classification Search ............... 236/49.3; 700/276, 278, 299, 300, 277
See application file for complete search history.

(56) References Cited

U.S. PATENT DOCUMENTS 2,747,842 A * 5/1956 Shataloff .................... 165/216
3,612,164 A * 10/1971 Miner ........................ 165/216

(Continued)

OTHER PUBLICATIONS

Liu, M., Claridge, D., and Turner, D., 2002, Continuous Commissioning Guidebook for Federal Energy Managers, Chapter 4, p. 28-30, Doe.

(Continued)

*Primary Examiner*—Chen-Wen Jiang
(74) *Attorney, Agent, or Firm*—Townsend and Townsend and Crew LLP

(57) ABSTRACT

A control strategy for supply fans in constant-volume heating, ventilating, and air-conditioning (HVAC) systems that reduces the speed of the fan at part-load conditions is provided. The invention consists of a constant-volume HVAC system, wireless discharge air temperature sensors, wireless hot source and cold source temperature sensors, and a wireless controller coupled to a fan modulation device. The controller includes a finite state machine that switches between a high-temperature control mode and a low-temperature control mode. The controller also includes a calculator that calculates a high temperature setpoint and a low temperature setpoint as a function of the hot source and cold source temperatures. In high temperature control mode, the controller compares the maximum discharge air temperature with the high temperature setpoint, and it commands the fan modulating device so that the maximum discharge air temperature remains close to the high temperature setpoint. In low temperature control mode, the controller compares the minimum discharge air temperature with the low temperature setpoint, and it commands the fan modulating device so that the minimum discharge air temperature remains close to the low temperature setpoint. Alternatively, the controller includes a calculator that computes a largest load as a function of previous fan command, discharge air temperatures, and readings from wireless zone temperature sensors. The controller increases the speed of the fan as the largest load increases, and reduces the speed of the fan as the largest load decreases.

32 Claims, 7 Drawing Sheets

U.S. PATENT DOCUMENTS

| | | | | |
|---|---|---|---|---|
| 3,933,197 | A * | 1/1976 | Zimmer et al. | 165/216 |
| 5,556,335 | A | 9/1996 | Holyoake | |
| 5,558,274 | A * | 9/1996 | Ben-Aissa et al. | 236/13 |
| 5,592,059 | A * | 1/1997 | Archer | 318/400.08 |
| 5,931,227 | A * | 8/1999 | Graves | 165/216 |
| 6,176,777 | B1 | 1/2001 | Smith et al. | |
| 6,240,324 | B1 * | 5/2001 | Preska et al. | 700/8 |
| 6,296,193 | B1 * | 10/2001 | West et al. | 236/13 |
| 6,736,326 | B2 | 5/2004 | Hunka | |
| 6,879,881 | B1 * | 4/2005 | Attridge, Jr. | 700/277 |
| 2002/0109011 | A1 * | 8/2002 | Fleckenstein | 236/49.3 |
| 2006/0117769 | A1 * | 6/2006 | Helt et al. | 62/161 |

OTHER PUBLICATIONS

Liu, M. and Claridge, D., 1999, "Converting Dual-Duct Constant-volume Systems to Variable Volume Systems Without Retrofitting the Terminals," ASHRAE Trans., 101(1), 66-70.

Johnson, G. A., 1984, "Retrofit of a Constant Volume Air System for Variable Speed Fan Control," ASHRAE Transactions, 90(2B), 201-212.

* cited by examiner

METHOD AND APPARATUS FOR CONVERTING CONSTANT-VOLUME SUPPLY FANS TO VARIABLE FLOW OPERATION

CROSS-REFERENCE TO RELATED APPLICATIONS

This application claims benefit under Title 35, United States Code §119(e) of U.S. Provisional Application No. 60/644,669 filed on Jan. 18, 2005.

BACKGROUND

1. Field of the Invention

The following invention relates to controls for fans in heating, ventilating, and air-conditioning (HVAC) systems, specifically to controls for converting constant speed fans to variable flow operation while preserving proper zone temperature control.

2. Description of Prior Art

Modern buildings typically use heating, ventilating, and air-conditioning (HVAC) systems to control indoor temperature, pressure, ventilation rate and other variables. Prior to the oil embargo of the 1970s it was common to design HVAC systems with constant-speed fans and with temperature controls that would re-heat cooled air or mix heated air with cooled air to maintain space temperature. HVAC systems with constant speed fans are called constant-volume systems.

There are three common types of constant-volume HVAC systems that serve multiple zones. One of these three is the single-duct re-heat system. These systems have a single supply duct that delivers cooled air to each zone re-heat coil. Re-heat coils add heat to the cooled air to keep the zone space temperature close to a setpoint. In rare cases the supply duct delivers hot air that is re-cooled by zone re-cooling coils.

A second type of constant-volume system is the dual-duct constant-volume system. Dual-duct systems deliver heated air and cooled air all the way to each zone terminal unit with separate hot air ducts and cold air ducts. The hot air duct has a heating coil and heating valve that are used to keep the hot air duct temperature close to a setpoint. The cold air duct has a cooling coil and a cooling valve that are used to keep the cold air duct temperature close to a setpoint. Zone terminal units mix the heated air with the cooled air to keep the zone space temperatures close to a setpoint.

The third common kind of constant-volume system is the multi-zone system. A multi-zone system is a special kind of dual-duct system where the hot air duct and the cold air duct are short, and are referred to as the hot deck and the cold deck, respectively. The mixing dampers are close to the fan, and are integrated with the hot deck and the cold deck. The mixing dampers for each zone mix heated air from the hot deck with cooled air from the cold deck to keep the zone temperature close to a setpoint. The hot deck and cold deck are packaged with the fan and other components of the system.

Constant-volume HVAC systems are inefficient. In states with strict energy codes, such as California, they are effectively prohibited in new construction. For HVAC systems that serve multiple zones, it is now common to use variable-air-volume (VAV) systems.

VAV systems have variable-speed fans that are controlled so that the amount of simultaneous heating and cooling or re-heating is significantly reduced. There are two common kinds of VAV systems: single-duct and dual-duct. Single-duct VAV systems supply cooled air to each zone terminal unit, where it is metered with a control damper when cooling is required or re-heated when heating is required. When heating, the amount of cooled air is reduced to a low level by the terminal controls. Dual-duct systems deliver heated air and cooled air all the way to each zone terminal unit with separate air ducts. Dual-duct VAV terminal units have independent dampers that modulate hot airflow rate to heat and modulate cold airflow rate to cool. Unlike the dual-duct constant-volume system, the dual-duct VAV system does very little mixing. Most of the time it supplies a variable amount of hot air when heating and a variable amount of cooled air when cooling. It only mixes air when the amount of heating or cooling is close to zero so that adequate ventilation air is provided.

Although constant-volume systems are less common in new construction, there is still a large installed base that serves billions of square feet of commercial buildings. Since they are inefficient, many retrofit strategies have been developed to modify their design and operation in order to make them more efficient.

One approach is to convert constant-volume systems to VAV systems. Typical VAV conversions for single-duct or dual-duct constant-volume systems involve replacing the constant-volume terminal units with VAV terminal units, adding terminal controls, adding a supply duct static pressure sensor, adding a variable frequency drive (VFD) to the fan, and adding a controller to regulate the supply duct pressure by modulating the fan speed with the VFD. These conversions are very expensive and intrusive because of the mechanical modifications. The spaces served by the system may have to be evacuated while the construction work is performed.

A typical VAV conversion for a multi-zone system involves disabling the hot deck, adding terminal units with control dampers and reheat coils to each zone supply duct, adding terminal controls, adding a supply duct static pressure sensor, adding a variable frequency drive (VFD) to the fan, and adding a controller to regulate the supply duct pressure by modulating the fan speed with the VFD. This approach is very expensive and very intrusive because it requires significant mechanical modifications.

Another way to convert constant-volume systems to VAV is to use VAV diffusers. U.S. Pat. No. 6,736,326 to Hunka, U.S. Pat. No. 6,176,777 to Smith et al., and U.S. Pat. No. 5,556,335 to Holyoake all describe VAV diffusers that can be used to convert constant-volume systems to VAV operation. This approach still requires mechanical modifications. Furthermore, all of the diffusers must be replaced for this method to work properly, and most zones have more than one diffuser.

For single-duct constant-volume systems, Liu, Claridge, and Turner (Continuous Commissioning Guidebook for Federal Energy Managers, DOE, 2002) add a VFD to reduce the fan speed during after-hours operation. During occupied hours the fan is operated at full speed. This strategy does not save energy for systems that are shut off after hours. Even when there is after-hours operation, this method is not cost effective unless the system is large because the energy savings are limited.

For dual-duct constant-volume systems, Liu and Claridge (Converting Dual-Duct Constant-volume Systems to Variable Volume Systems Without Retrofitting the Terminals, *ASHRAE Transactions*, Vol. 101, Part 1, 1999, pp. 66-70) describe a means for improving energy performance without retrofitting terminal units. They add a damper to the hot duct and use it to control the pressure in the hot duct. This strategy still requires a mechanical modification, which is intrusive and requires that the system be shut down. It also requires the installation of pressure sensors in the hot air duct and cold air duct.

For multi-zone constant-volume systems, Liu, Claridge, and Turner (Continuous Commissioning Guidebook for Federal Energy Managers, DOE, 2002) describe a means for improving the energy performance by adding a VFD to the supply fan and controlling the supply fan speed so that the most-open mixing damper is 95% open to the hot deck in the heating season. In the cooling season their strategy controls the fan speed so that the most-open mixing damper is 95% open to the cold deck. The command to the VFD comes from a Proportional-Integral-Derivative (PID) controller that takes the most-open damper position as input. This strategy requires that position sensors be added to the mixing dampers. Position sensors are expensive and difficult to install. Resistive position sensors are prone to vibration-induced premature failure. This strategy cannot be applied to single-duct constant-volume systems because they do not have mixing dampers.

Johnson (Johnson, G. A., 1984, "Retrofit of a Constant Volume Air System for Variable Speed Fan Control," ASHRAE Transactions, 90(2B), 201-212.) describes a system for retrofitting single-zone constant volume air-handling units to VAV operation. Johnson's system does not apply to air-handling units that serve multiple zones. It also does not apply to single-zone systems that heat and cool. The units on which it was demonstrated were cooling-only units. Johnson's approach is to control the supply air temperature to a fixed setpoint with the cooling valve or outdoor air dampers, and then adjust the supply fan speed based on the average zone temperature so that the average zone temperature is maintained at a setpoint.

SUMMARY OF THE INVENTION

In accordance with the present invention, a control system for reducing the speed of the supply fan of a constant-volume HVAC system comprises the supply fan, a fan modulating device, and a plurality of discharge air temperature (DAT) sensors and a controller that calculates the supply fan speed based on the discharge air temperature sensor readings. The controller causes the fan speed to be reduced when the heating or cooling load is less than the design load.

OBJECTS OF THE INVENTION

Accordingly, a primary object of the present invention is to provide a control strategy for fans of constant-volume HVAC systems that can improve the energy efficiency at part-load conditions.

Another object of the present invention is to provide a control strategy for fans of constant-volume HVAC systems that can improve the energy efficiency at part-load conditions without requiring the installation of mechanical components such as air terminals, dampers or VAV diffusers.

Another object of the present invention is to provide a control strategy for fans of constant-volume HVAC systems that is applicable to all kinds of constant-volume HVAC systems.

Another object of the present invention is to provide a control strategy for fans of constant-volume HVAC systems that can improve the energy efficiency at part-load conditions and that uses sensors that are easy to install and that are inexpensive.

Other further objects of the present invention will become apparent from a careful reading of the included drawing figures, the claims, and detailed description of the invention.

Figure 1:
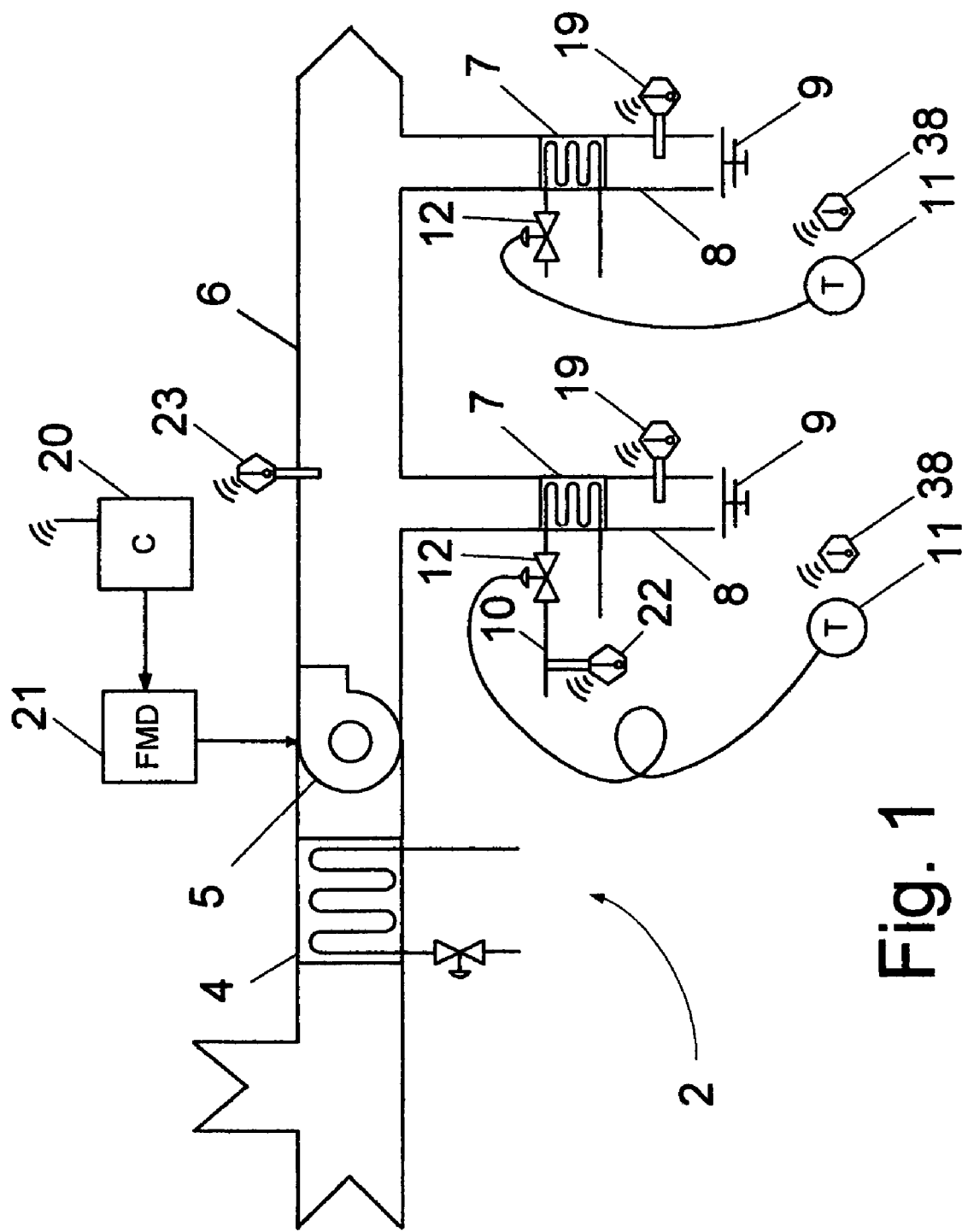
FIG. 1 is a schematic diagram of a portion of a single-duct constant-volume HVAC system.

| REFERENCE NUMERALS IN DRAWINGS | |
|---|---|
| 1 HVAC system | 2 single-duct constant-volume system |
| 3 dual-duct constant-volume system | 4 cooling coil |
| 5 supply fan | 6 supply air duct |
| 7 re-heat coil | 8 discharge air duct |
| 9 discharge air diffuser | 10 hot water supply pipe |
| 11 thermostat | 12 re-heat valve |
| 13 heating coil | 14 cold air duct |
| 15 hot air duct | 16 dual duct air terminals |
| 17 mixing dampers | 18 actuator |
| 19 discharge air temperature sensor | 20 supply fan controller |
| 21 fan modulation device | 22 hot source sensor |
| 23 cold source sensor | 24 high temperature control mode |
| 25 low temperature control mode | 26 low DAT event |
| 27 high DAT event | 28 initialize PID entry function |
| 29 high temperature control loop | 30 low temperature control loop |
| 31 maximum temperature calculator | 32 high temperature setpoint calculator |
| 33 PID calculator | 34 minimum fan command |
| 35 maximum command calculator | 36 minimum temperature calculator |
| 37 low temperature setpoint calculator | 38 zone temperature sensor |
| 39 zone load calculator | 40 largest load calculator |
| 41 fan command calculator | 42 summation calculator |
| 43 previous fan command | |

DESCRIPTION OF THE PREFERRED EMBODIMENT

A preferred embodiment of the supply fan control system is illustrated in FIG. 1-5. HVAC system 1 may be a single-duct re-heat system 2, a dual-duct constant-volume system 3 or a multi-zone system. FIG. 1 shows single-duct system 2. Single-duct systems 2 include a cooling coil 4, a supply fan 5, supply air ducts 6, re-heat coils 7, discharge air ducts 8, and discharge air diffusers 9. Cooling coil 4 is a heat exchanger that carries a cooling fluid such as chilled water or a chilled water and glycol solution. Cooling coil 4 is mounted in supply air duct 6. Supply fan 5 could be a centrifugal fan or an axial fan. Supply fan 5 is mounted in supply duct 6. A duct is an elongate sheet metal structure with round or rectangular cross-section designed to transport air. Supply duct 6 contains branches that lead to re-heat coils 7. Re-heat coil 7 is a heat exchanger that carries heating fluid supplied by a hot water supply pipe 10. It is mounted between a branch of supply duct 6 and discharge air duct 8. Discharge air duct 8 is a duct between reheat coil 7 and diffuser 9. A thermostat 11 in the occupied space adjusts a re-heat valve 12, which modulates the flow of heating fluid through re-heat coil 7. Re-heat valve 12 is connected to hot water supply pipe 10 and re-heat coil 7.

Figure 2:
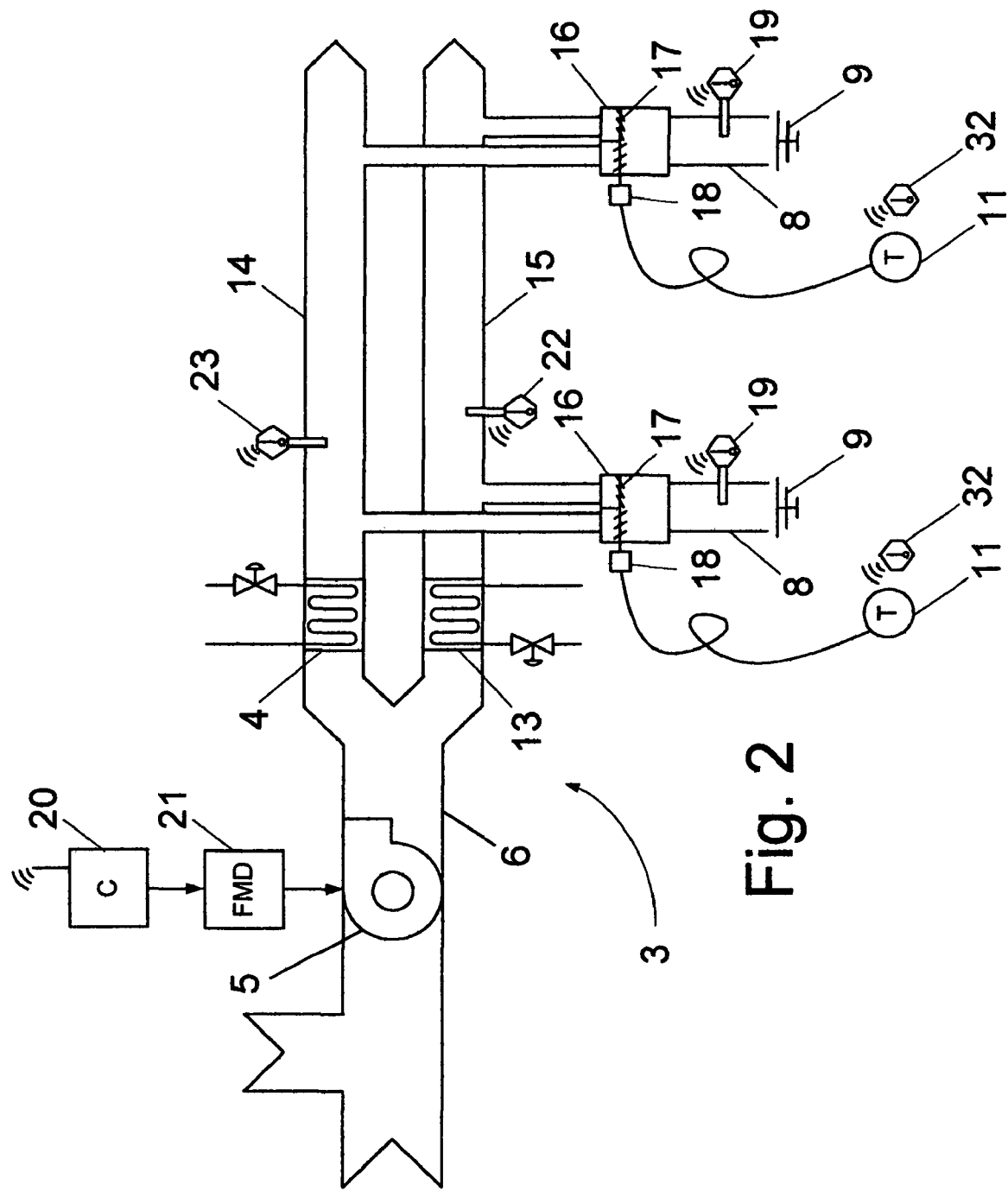
FIG. 2 is a schematic diagram of a portion of a dual-duct constant-volume HVAC system.

FIG. 2 shows dual-duct system 3. Dual-duct systems 3 include supply fan 5, supply duct 6, cooling coil 4, a heating coil 13, a cold air duct 14, a hot air duct 15, dual duct air terminals 16, discharge air ducts 8, and diffusers 9. Supply fan 5 is mounted in supply duct 6. Supply duct 6 is connected to cold air duct 14 and hot air duct 15. Cooling coil 4 is mounted at the beginning of cold air duct 14. Heating coil 13 is mounted at the beginning of hot air duct 15. Cold air duct 14 has branches that connect to air terminals 16. Hot air duct 15 also has branches that connect to air terminals 16. Air terminals contain mixing dampers 17 that mix hot air from hot air duct 15 with cold air from cold air duct 14. Mixing dampers 17 are assemblies consisting of movable blades mounted on axles in a frame. Thermostat 11 adjusts actuator 18, which is connected to mixing dampers 17.

A multi-zone system is a dual-duct system 3 with a short cold air duct 14 and a short hot air duct 15 (referred to as a cold deck and a hot deck, respectively) so that mixing dampers 17 are located close to supply fan 5.

HVAC systems 1 contains other mechanical components not shown in FIG. 1 and FIG. 2 such as filters, louvers, and humidifiers, which are used for other functions such as cleaning air, ventilation, and humidification.

For single-duct systems 2, a discharge air temperature sensor 19 is located in discharge air duct 8 to measure air temperature inside discharge air duct 8. Discharge air temperature sensors 19 are preferably wireless devices that communicate with a supply fan controller 20 using radio frequency communication. Controller 20 is preferably an electronic device comprising in combination a memory, a microprocessor, and a radio. Controller 20 is connected to a fan modulation device 21. Fan modulation device 21 could be a variable-speed drive, variable inlet guide vanes, a throttling device such as a damper, or a device to adjust the pitch of the fan blades. A hot source sensor 22 is attached to hot water pipe 10 to measure temperature of hot water supply pipe 10. Hot source sensor 22 is preferably a wireless device that communicates with controller 20 using radio frequency communication. A cold source sensor 23 is located in supply duct 6 to measure air temperature inside supply duct 6. Cold source sensor 23 is preferably a wireless device that communicates with controller 20 using radio frequency communication.

For dual-duct systems 3, a discharge air temperature sensor 19 is located in discharge air duct 8 to measure air temperature inside discharge air duct 8. Discharge air temperature sensors 19 are preferably wireless devices that communicate with controller 20 using radio frequency communication. Controller 20 is preferably an electronic device comprising in combination a memory, a microprocessor, a radio, and analog outputs. Controller 20 is connected to a fan modulation device 21. Fan modulation device 21 could be a variable-speed drive, variable inlet guide vanes, a throttling device such as a damper, or a device to adjust the pitch of the fan blades. A hot source sensor 22 is located in hot air duct to measure air temperature inside hot air duct 15. Hot source sensor 22 is preferably a wireless device that communicates with controller 20 using radio frequency communication. A cold source temperature sensor 23 is located in cold air duct to measure air temperature inside cold air duct 15. Cold source temperature sensor 23 is preferably a wireless device that communicates with controller 20 using radio frequency communication.

Figure 3:
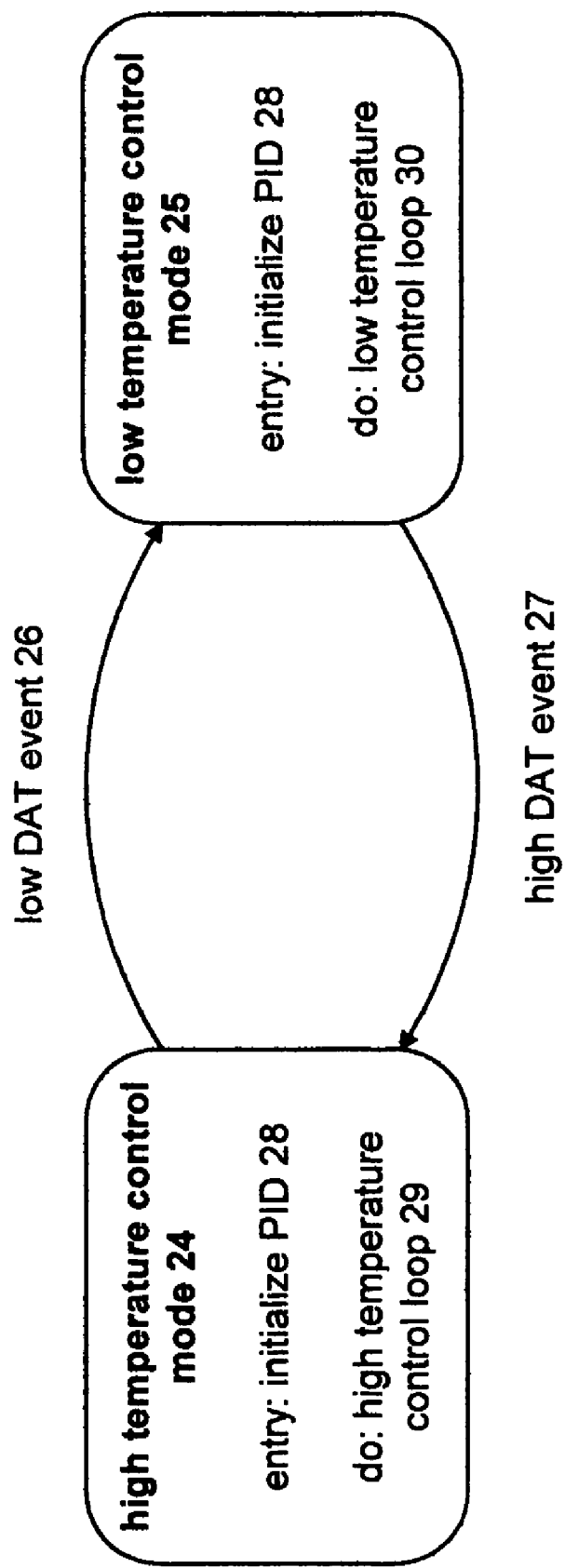
FIG. 3 shows a state transition diagram of a preferred embodiment for controlling a supply fan of a constant-volume HVAC system.

FIG. 3 shows a state transition diagram for controller 20. The finite state machine has two modes of operation, a high temperature control mode 24 and a low temperature control mode 25. A low DAT event 26 and a high DAT event 27 are the state transition events linking high temperature control mode 24 and low temperature control mode 25. Low DAT event 26 occurs when the minimum discharge air temperature becomes less than the low temperature setpoint minus a low temperature offset. High DAT event 27 occurs when the maximum discharge air temperature becomes greater than the high temperature setpoint plus a high temperature offset. High temperature control mode 24 and low temperature control mode 25 both have an initialize PID entry function 28. High temperature control mode 24 has a high temperature control loop 29 activity. Low temperature control mode 25 has a low temperature control loop 30 activity.

Figure 4:
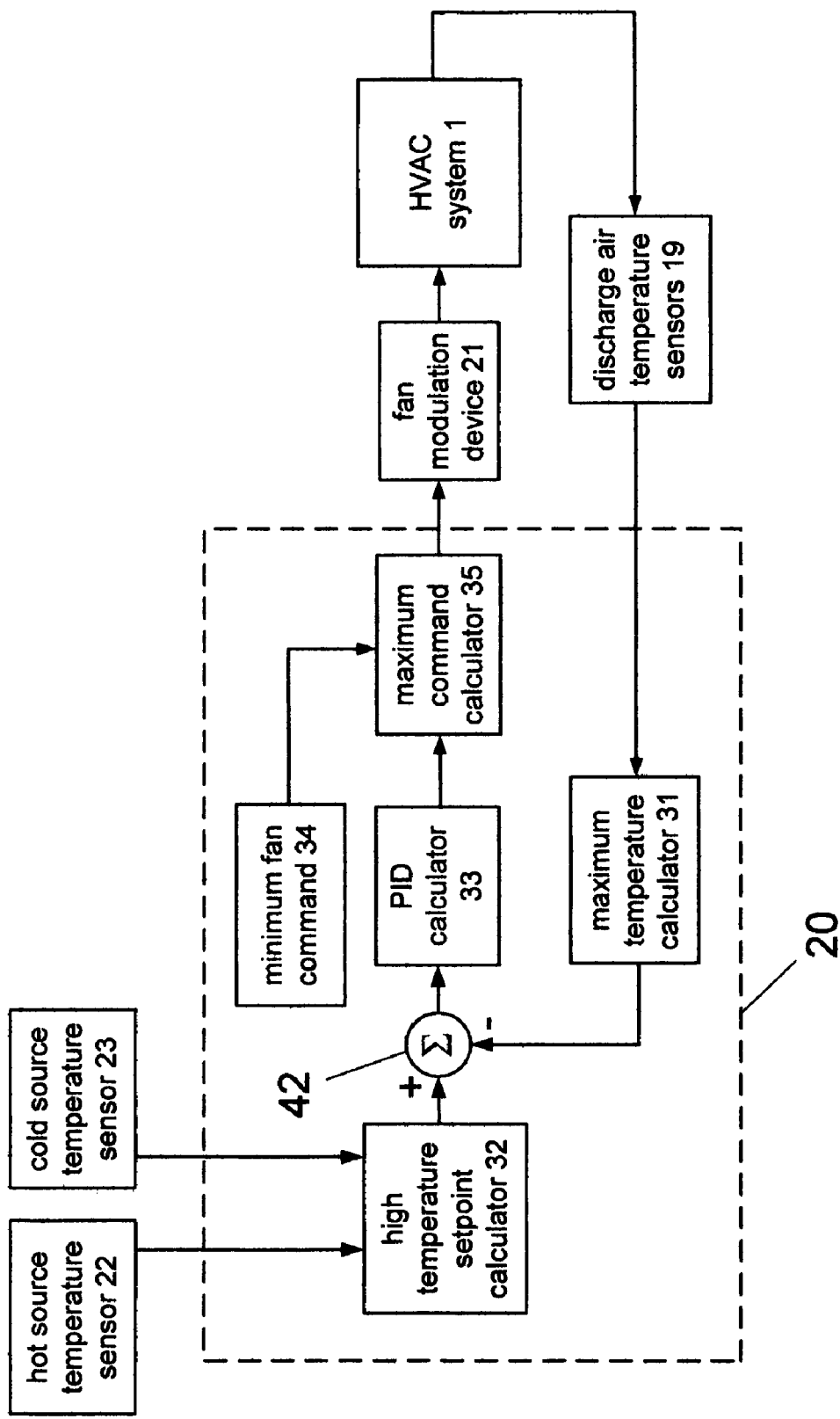
FIG. 4 shows a block diagram of the high temperature control loop of the preferred embodiment.

FIG. 4 shows a block diagram of high temperature control loop 29. Outputs of discharge air temperature sensors 19 are inputs to a maximum temperature calculator 31. Outputs of hot source temperature sensor 22 and cold source temperature sensor 23 are inputs to a high temperature setpoint calculator 32. Output of maximum temperature calculator 31 and output of high temperature setpoint calculator 32 are inputs of a summation calculator 42. Output of summation calculator 42 is an input to a PID calculator 33. Output of PID calculator 33 and output of a minimum fan command 34 are inputs of a maximum command calculator 35. Output of maximum command calculator 35 is input to fan modulation device 21. Fan modulation device affects the output of supply fan 5, which in turn affects discharge air temperatures.

Figure 5:
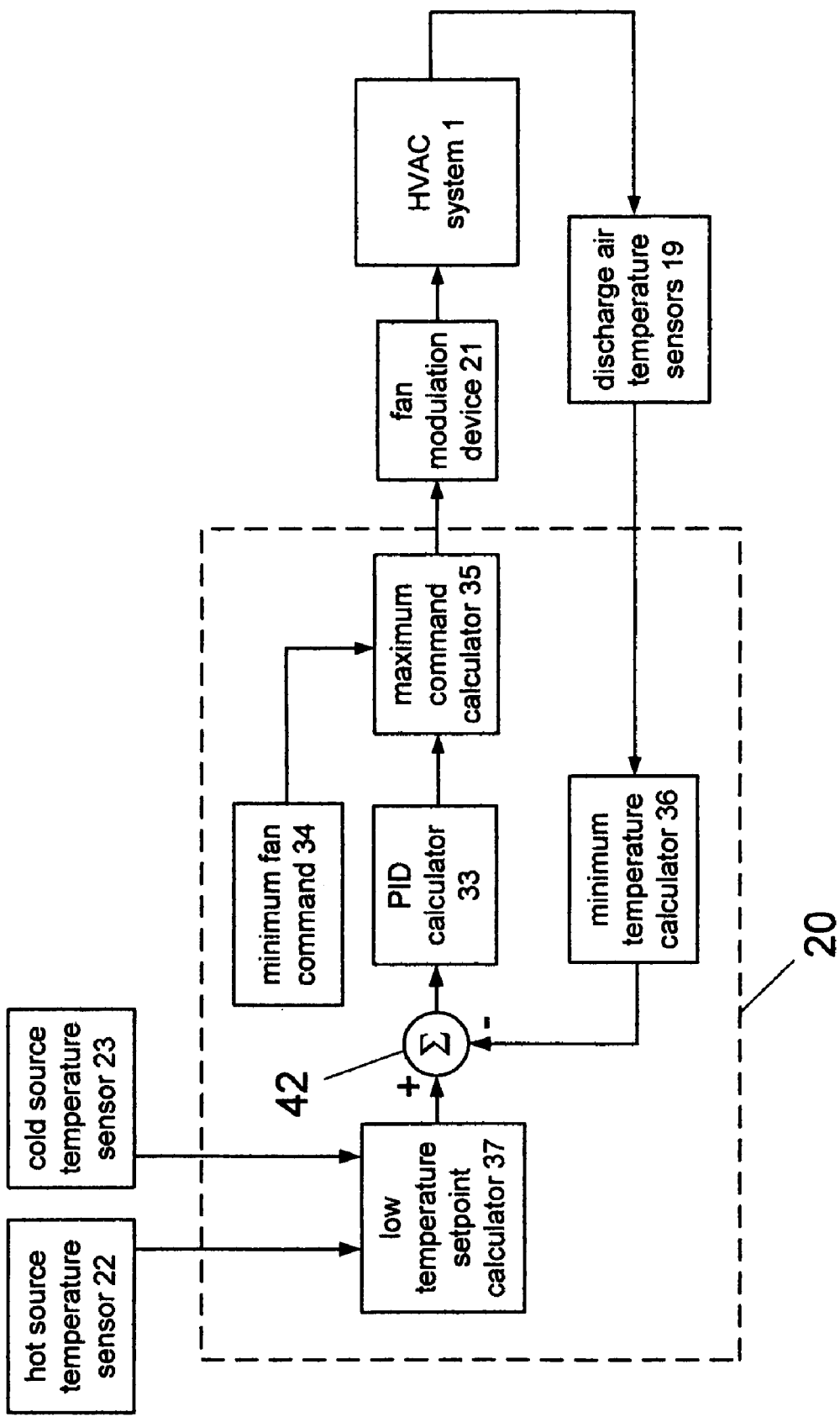
FIG. 5 shows a block diagram of the low temperature control loop of the preferred embodiment.

FIG. 5 shows a block diagram of low temperature control loop 30. Outputs of discharge air temperature sensors 19 are inputs to a minimum temperature calculator 36. Outputs of hot source temperature sensor 22 and cold source temperature sensor 23 are inputs to a low temperature setpoint calculator 37. Output of minimum temperature calculator 36 and output of low temperature setpoint calculator 37 are inputs of summation calculator 42. Output of summation calculator 42 is an input to PID calculator 33. Output of PID calculator 33 and minimum fan command 34 are inputs to maximum command calculator 35. Output of maximum command calculator 35 is input to fan modulation device 21. Fan modulation device affects the output of supply fan 5, which in turn affects discharge air temperatures.

OPERATION OF THE PREFERRED EMBODIMENT

In operation, controller 20 adjusts fan modulation device 21 to either keep the maximum discharge air temperature close to the high temperature setpoint or to keep the minimum discharge air temperature close to the cold temperature setpoint.

When the system is first turned on controller 20 reads values from hot source temperature sensor 22 and cold source temperature sensor 23 and computes the high temperature setpoint and the low temperature setpoint as follows:

$$T_{h,s} = T_c + F_h(T_h - T_c) \quad (1)$$

$$T_{c,s} = T_c + F_c(T_h - T_c) \quad (2)$$

where $T_{h,s}$ denotes high temperature setpoint, $T_c$ denotes cold source temperature, $F_h$ is a number between zero and one preferably equal to 0.85, $T_h$ denotes hot source temperature, $T_{h,s}$ denotes high temperature setpoint, and $F_c$ is a number between zero and $F_h$ preferably equal to 0.15.

On startup controller 20 begins operating in high temperature control mode 24 unless one of the two conditions is true: 1) the minimum discharge air temperature is less than the low temperature setpoint and the maximum discharge air temperature is less than the high temperature setpoint, 2) the minimum discharge air temperature is less than the low temperature setpoint and the maximum discharge air temperature is greater than the high temperature setpoint but the difference between the low temperature setpoint and the minimum discharge air temperature is greater than the difference between the maximum discharge air temperature and the high temperature setpoint. If either of these two conditions is true, then controller 20 begins operation in low temperature control mode 25.

If controller 20 begins operating in high temperature control mode 24 and the maximum discharge air temperature is greater than the high temperature setpoint, then PID calculator 33 causes fan modulation device 21 to increase airflow rate through supply fan 5. In response to the increased flowrate, thermostat 11 causes the maximum discharge air temperature to decrease, preserving the heat transfer rate. Eventually controller 20 adjustments to fan modulation device 21 cause the discharge air temperature to reach the high temperature setpoint. Otherwise fan modulation device 21 receives minimum fan command 34, causing supply fan 5 to deliver the minimum required airflow.

If controller 20 begins operating in low temperature control mode 25 and the minimum discharge air temperature is less than the low temperature setpoint, then PID calculator 33 causes fan modulation device 21 to increase airflow rate through supply fan 5. In response to the increased airflow rate, thermostat 11 causes the minimum discharge air temperature to increase, preserving the heat transfer rate. Eventually controller 20 adjustments to fan modulation device 21 cause the minimum discharge air temperature to reach the low temperature setpoint. Otherwise fan modulation device 21 receives the minimum fan command 34, causing supply fan 5 to deliver the minimum required airflow.

If while operating in high temperature control mode 24 the low DAT event 26 occurs, then operation switches to low temperature control mode 25. PID calculator 33 is initialized by initialize PID 28 entry function so that the mode switching is bumpless. This is accomplished by setting the integration term of PID calculator 33 to the value that will make the output of PID calculator 33 equal the last output in high temperature control mode 24. After PID calculator 33 is initialized, low temperature control loop 30 is executed repeatedly. Low temperature control loop 30 execution involves reading values from discharge air temperatures sensors 19, computing the minimum discharge air temperature with minimum temperature calculator 36, reading values from hot source temperature sensor 22 and cold source temperature sensor 23, computing the low temperature setpoint with low temperature setpoint calculator 37, subtracting the minimum discharge air temperature from the low temperature setpoint with summation calculator 42, computing the output of PID calculator 33, then passing the maximum of the output of PID calculator 33 and minimum fan command 34 to maximum command calculator 35. Output of maximum command calculator 35 is passed as input to fan modulation device 21.

If while operating in low temperature control mode 25 the high DAT event 27 occurs, then operation switches to high temperature control mode 24. PID calculator 33 is initialized by initialize PID 28 entry function so that the mode switching is bumpless. This is accomplished by setting the integration term of PID calculator 33 to the value that will make the output of PID calculator 33 equal the last output in low temperature control mode 25. After PID calculator 33 is initialized, high temperature control loop 29 is executed repeatedly. High temperature control loop 29 execution involves reading the values of discharge air temperature sensors 19, computing the maximum value with maximum temperature calculator 31, reading values from hot source temperature sensor 22 and cold source temperature sensor 23, computing the high temperature setpoint with high temperature setpoint calculator 32, subtracting the maximum discharge air temperature from the high temperature setpoint with summation calculator 42, computing the output of PID calculator 33, then passing the maximum of the output of PID calculator 33 and minimum fan command 29 to maximum command calculator 35. The output of maximum command calculator 35 is passed as input to fan modulation device 21.

DESCRIPTION OF AN ALTERNATIVE EMBODIMENT

An alternative embodiment is illustrated in FIGS. 1, 2, 6, and 7. The alternative embodiment has the same mechanical components as the preferred embodiment. For single-duct system 2, these include cooling coil 4, supply fan 5, supply air duct 6, re-heat coils 7, discharge air ducts 8, discharge air diffusers 9, hot water supply pipes 10, thermostats 11, and re-heat valves 12, which are interconnected in the manner described in the description of the preferred embodiment. For a dual-duct system 3, these include cooling coil 4, supply fan 5, supply duct 6, discharge air ducts 8, discharge air diffusers 9, thermostats 11, heating coil 13, cold air duct 14, hot air duct 15, dual duct air terminals 16, mixing dampers 17, and actuators 18, which are interconnected in the manner described in the description of the preferred embodiment.

Discharge air temperature sensors 19 are located in discharge air ducts 8 to measure air temperature inside discharge air ducts 8. Discharge air temperature sensors 19 are preferably wireless devices that communicate with controller 20 using radio frequency communication. Each zone that has discharge air temperature sensor 19 has a zone temperature sensor 38. Zone temperature sensors 38 measure temperature in the occupied space of a building. Zone temperature sensors 38 are preferably wireless devices that communicate with controller 20 using radio frequency communications. Controller 20 is preferably an electronic device comprising in combination a memory, a microprocessor, a radio, and analog outputs. Controller 20 is connected to a fan modulation device 21. Fan modulation device 21 could be a variable-speed drive, variable inlet guide vanes, a throttling device such as a damper, or a device to adjust the pitch of the fan blades.

Figure 6:
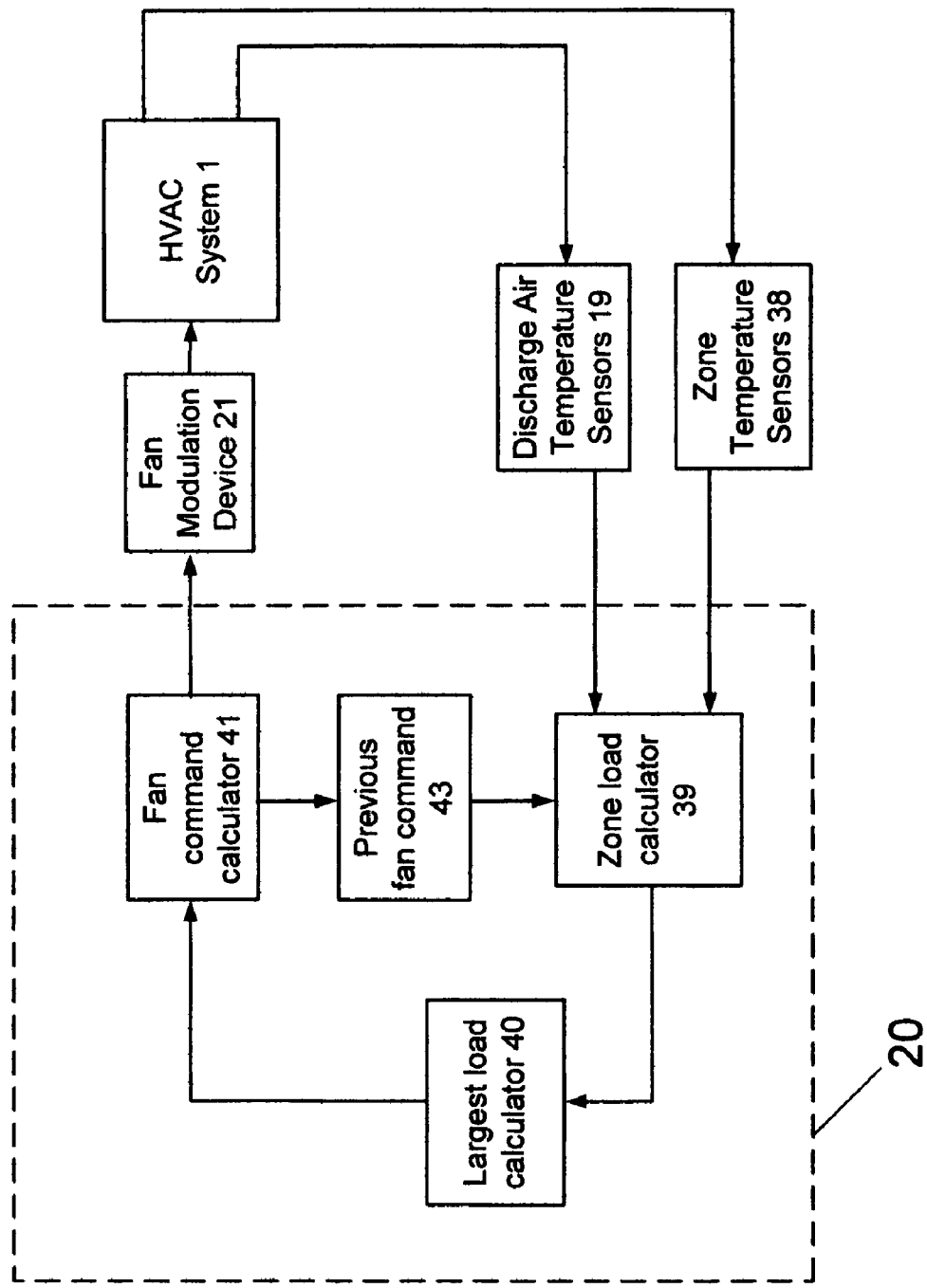
FIG. 6 shows a block diagram of the control calculations of an alternative embodiment.

FIG. 6 show a block diagram of the calculations of the alternative embodiment. Controller 19 contains a zone load calculator 39, a largest load calculator 40, and a fan command calculator 41. Outputs from discharge air temperature sensors 19, zone temperature sensors 38, and the previous fan command 43 are inputs to zone load calculator 39. Outputs from zone load calculator 39 are inputs to largest load calculator 40. Output from largest load calculator 40 is input to fan command calculator 41. Output of fan command calculator 41 is input to fan modulation device 21 and previous fan command 43.

OPERATION OF AN ALTERNATIVE EMBODIMENT

In operation, controller 20 adjusts fan modulation device 21 such that the fan delivers more air when the largest load is larger and delivers the minimum necessary flow when the largest load is zero.

When the system is first turned on, previous fan command 43 is initialized to the minimum fan command. Controller 20 reads values from discharge air temperature sensors 19 and zone temperature sensors 38 and previous fan command 43. For each zone with a discharge air temperature sensor 19 and a zone temperature sensor 38, zone load calculator 39 computes a calculated load according to the following equation:

$$L_i = w_i \rho M F C_p (T_{d,i} - T_{z,i}) \quad (3)$$

where $L_i$ denotes a calculated load associated the $i^{th}$ zone, $w_i$ denotes a weight associated with the $i^{th}$ zone, $\rho$ denotes air density, M denotes previous fan command 43, F denotes the supply flow rate when the fan modulation device 21 command is 100%, $C_p$ denotes the specific heat of air at constant pressure, $T_{d,i}$ denotes discharge air temperature of the $i^{th}$ zone, and $T_{z,i}$ denotes zone temperature of the $i^{th}$ zone.

Largest load calculator 40 computes the largest normalized load by first computing the maximum of the absolute values of the calculated zone loads, then multiplying the maximum absolute zone load by the sign of the calculated zone load with largest absolute value, then dividing that result by a design load. If the sign of the calculated zone load with largest absolute value is negative, indicating a cooling load, then the design load used in the calculation is the design cooling load. If the sign of the calculated zone load with largest absolute value is positive, indicating a heating load, then the design load used in the calculation is the design heating load.

Figure 7:
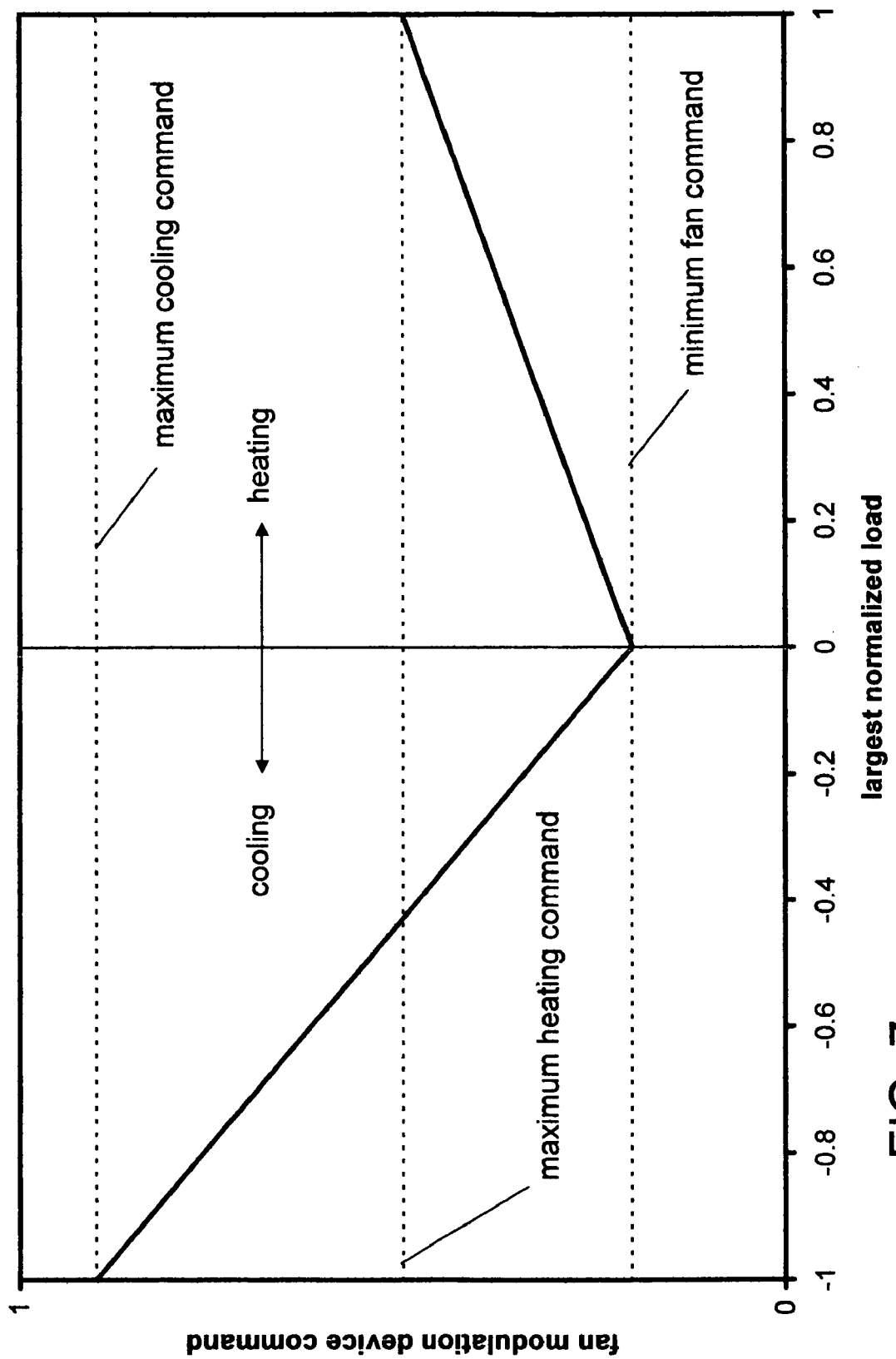
FIG. 7 shows a relationship between the largest normalized load and the fan modulation device command for an alternative embodiment.

Fan command calculator 41 computes the command from controller 20 to fan modulation device 21 using the function shown in FIG. 7. The function is linear between a minimum value and a maximum value. The maximum fan command when heating is preferably lower than the maximum fan command when cooling.

CONCLUSION, RAMIFICATIONS, AND SCOPE

Accordingly, the reader will see that the supply fan control system of this invention has a number of advantages including the following:
(a) It can greatly improve the energy efficiency of constant-volume HVAC systems.
(b) It does not require the installation of mechanical components such as air terminals, dampers or VAV diffusers.
(c) It is applicable to all kinds of constant-volume HVAC systems.
(d) It uses sensors that are easy to install and that are inexpensive.

This disclosure is provided to reveal preferred embodiments of the invention and a best mode for practicing the invention. Having thus described the invention in this way, it should be apparent that various different modifications can be made to the preferred embodiment without departing from the scope and spirit of this disclosure. For instance, the invention can be adapted to operate a single-duct re-heat system with electric re-heat by using a fixed rather than measured hot source temperature. Discharge air temperature sensors 19 could be installed in diffusers 9 instead of discharge air ducts 8, since discharge air flows through them. Fixed zone temperature values such as 72 degrees Fahrenheit could be used instead of readings from zone temperature sensors 38. Return air temperature could be used instead of zone temperature. A reading from a supply airflow sensor could be used to compute calculated loads instead of fan modulation device 21 command.

Thus the scope of the invention should be determined by the appended claims and their legal equivalents, rather than by the examples given.

I claim:

1. A method for controlling a supply fan of a constant-volume heating, ventilating, and air conditioning (HVAC) system, the method including:
   measuring a plurality of discharge air temperatures using respective discharge air temperature sensors, wherein each discharge air temperature corresponds to a different zone serviced by the HVAC system;
   computing a high discharge air temperature and a low discharge air temperature from the plurality of discharge air temperatures;
   calculating a command for a fan modulating device with a supply fan controller based on said discharge air temperature so that a supply fan speed is increased when:
      the high temperature discharge air temperature becomes greater than a high temperature setpoint while operating in a high temperature mode; and is increased when
      the low temperature discharge air temperature becomes less than a low temperature setpoint while operating in a low temperature mode.

2. The method of claim 1, further including switching between the high temperature control mode and the low temperature control mode.

3. The method of claim 2 further including adjusting said fan modulating device with said supply fan controller to keep said high discharge air temperature close to the high air temperature setpoint when operating in said high temperature control mode.

4. The method of claim 3, further including measuring a temperature of a hot source, wherein the hot source is used to heat air in the HVAC system, and wherein said high temperature setpoint is computed based on said hot source temperature.

5. The method of claim 4, wherein the high temperature setpoint equals a cold source temperature plus a first proportion of the difference between the hot source temperature and a cold source temperature.

6. The method of claim 5, wherein the low temperature setpoint equals the cold source temperature plus a second proportion of the difference between the hot source temperature and the cold source temperature, wherein the second proportion is less than the first proportion.

7. The method of claim 2 further including the step of adjusting said fan modulating device with said supply fan controller to keep said low discharge air temperature close to the low temperature setpoint when operating in said low temperature control mode.

8. The method of claim 7, further including measuring a temperature of a cold source, wherein the cold source is used to cool air in the HVAC system, and wherein said low temperature setpoint is computed based on said cold source temperature.

9. The method of claim 2 wherein said switching from said high temperature control mode to said low temperature control mode is triggered by said low discharge air temperature dropping below the low temperature setpoint minus an offset.

10. The method of claim 2 wherein said switching from said low temperature control mode to said high temperature control mode is triggered by said high discharge air temperature rising above the high temperature setpoint plus an offset.

11. The method of claim 2 wherein said switching from said high temperature control mode to said low temperature control mode is triggered when a difference between the low temperature setpoint and the low discharge air temperature is greater than a difference between the high discharge air temperature and the high temperature setpoint.

12. The method of claim 1 further including measuring a zone temperature for each zone serviced by the HVAC system.

13. The method of claim 12 further including computing a zone load for each zone as follows:

$$L_i = w_i M (T_{z,i} - T_{d,i})$$

where $L_i$ is said zone load of an $i^{th}$ zone, $w_i$ is a weight for said $i^{th}$ zone, M is a previous fan command, $T_{z,i}$ is said zone temperature of said $i^{th}$ zone, and $T_{d,i}$ is said discharge air temperature of said $i^{th}$ zone.

14. The method of claim 13 further including the step of computing a maximum absolute zone load as follows:

$$L_{max} = \max(L_i)$$

15. The method of claim 14 wherein said fan modulating device command is computed as a monotonic function of said maximum absolute zone load.

16. The method of claim 15 wherein said monotonic function is a linear function.

17. The method of claim 1, wherein the high discharge air temperature is a maximum of the plurality of air discharge temperatures and the low discharge air temperature is a minimum of the plurality of air discharge temperatures.

18. The method of claim 1, further including:
receiving, at the fan modulating device from the supply fan controller, a command to operate the supply fan at a minimum speed when the high air discharge temperature is not above the high temperature set point and the low discharge air temperature is not below the low temperature setpoint.

19. An apparatus for controlling a constant-volume heating, ventilating, and air conditioning (HVAC) system, the apparatus comprising:
a plurality of discharge air temperature sensors used to measure a plurality of discharge air temperatures, wherein each discharge air temperature corresponds to a different zone serviced by the HVAC system;
a supply fan;
a fan modulating device coupled to said supply fan; and
a supply fan controller coupled with the fan modulating device and communicably coupled with the discharge air temperature sensors, wherein the supply fan controller is configured to:
compute a high discharge air temperature and a low discharge air temperature from the plurality of discharge air temperatures; and
calculate a command for the fan modulating device based on said discharge air temperature so that a supply fan speed is increased when:
the high temperature discharge air temperature becomes greater than a high temperature setpoint while operating in a high temperature mode; and is increased when
the low temperature discharge air temperature becomes less than a low temperature setpoint while operating in a low temperature mode.

20. The apparatus of claim 19, wherein the supply fan controller is further configured to:
switch between the high temperature control mode and the low temperature control mode.

21. The apparatus of claim 20, wherein the supply fan controller is further configured to:
adjust said fan modulating device to keep said high discharge air temperature close to the high air temperature setpoint when operating in said high temperature control mode.

22. The apparatus of claim 21, wherein the supply fan controller is further configured to:
receive a measurement of a temperature of a hot source from hot source temperature sensor, wherein the hot source is used to heat air in the HVAC system, and wherein said high temperature setpoint is computed based on said hot source temperature.

23. The apparatus of claim 22, wherein the supply fan controller is further configured to:
compute the high temperature setpoint, wherein the high temperature setpoint equals a cold source temperature plus a first proportion of the difference between the hot source temperature and a cold source temperature.

24. The apparatus of claim 23, wherein the supply fan controller is further configured to:
compute the low temperature setpoint, wherein the low temperature setpoint equals the cold source temperature plus a second proportion of the difference between the hot source temperature and the cold source temperature, wherein the second proportion is less than the first proportion.

25. The apparatus of claim 20, wherein the supply fan controller is further configured to:
adjust said fan modulating device to keep said low discharge air temperature close to the low temperature setpoint when operating in said low temperature control mode.

26. The apparatus of claim 25, wherein the supply fan controller is further configured to:
receive a measurement of a temperature of a cold source from a cold source temperature sensor, wherein the cold source is used to cool air in the HVAC system, and wherein said low temperature setpoint is computed based on said cold source temperature.

27. The apparatus of claim 20, wherein the supply fan controller is further configured to:
switch from said high temperature control mode to said low temperature control mode when a difference between the low temperature setpoint and the low discharge air temperature is greater than a difference between the high discharge air temperature and the high temperature setpoint.

28. The apparatus of claim 19, further comprising a zone temperature sensor that measures a zone temperature for each zone serviced by the HVAC system.

29. The apparatus of claim 28, wherein the supply fan controller is further configured to:
compute a zone load for each zone as follows:

$$L_i = w_i M(T_{z,i} - T_{d,i})$$

where $L_i$ is said zone load of an $i^{th}$ zone, $w_i$ is a weight for said $i^{th}$ zone, M is a previous fan command, $T_{z,i}$ is said zone temperature of said $i^{th}$ zone, and $T_{d,i}$ is said discharge air temperature of said $i^{th}$ zone.

30. The apparatus of claim 29 wherein the supply fan controller is further configured to compute a maximum absolute zone load as follows:

$$L_{max} = \max(L_i)$$

31. The apparatus of claim 30 wherein said fan modulating device command is computed as a monotonic function of said maximum absolute zone load.

32. The apparatus of claim 19, wherein the supply fan controller is further configured to send, to the fan modulating device, a command to operate the supply fan at a minimum speed when the high air discharge temperature is not above the high temperature set point and the low discharge air temperature is not below the low temperature setpoint.

* * * * *